United States Patent

Ito et al.

[11] Patent Number: 5,814,897
[45] Date of Patent: Sep. 29, 1998

[54] VEHICLE PASSENGER RESTRAINT SYSTEM

[75] Inventors: Koji Ito, Ama gun; Seiichi Shin, Kitasouma gun; Katsu Hattori, Nagoya, all of Japan

[73] Assignee: Aisin Seiki Kabushiki Kaisha, Kariya, Japan

[21] Appl. No.: 827,115

[22] Filed: Mar. 27, 1997

[30] Foreign Application Priority Data

Mar. 28, 1996 [JP] Japan .................................. 8-074819
Jul. 19, 1996 [JP] Japan .................................. 8-191057

[51] Int. Cl.$^6$ .................................................. B60R 21/32
[52] U.S. Cl. ..................... 307/10.1; 180/282; 280/735; 701/47
[58] Field of Search ..................... 307/9.1, 10.1, 307/121; 280/734, 735; 180/271, 273, 282; 701/36, 45, 46, 47

[56] References Cited

U.S. PATENT DOCUMENTS

| 5,034,891 | 7/1991 | Blackburn et al. | 307/10.1 |
| 5,036,467 | 7/1991 | Blackburn et al. | 280/735 |
| 5,065,322 | 11/1991 | Mazur et al. | 280/735 |
| 5,185,701 | 2/1993 | Blackburn et al. | 307/10.1 |
| 5,379,221 | 1/1995 | Schulter et al. | 307/10.1 |
| 5,667,244 | 9/1997 | Ito et al. | 280/735 |

FOREIGN PATENT DOCUMENTS

| 4-275685 | 10/1992 | Japan . |
| 4-358945 | 12/1992 | Japan . |
| 6-107112 | 4/1994 | Japan . |
| 6-92199 | 4/1994 | Japan . |
| 8-258665 | 10/1996 | Japan . |
| 8-258666 | 10/1996 | Japan . |

*Primary Examiner*—Richard T. Elms
*Attorney, Agent, or Firm*—Burns, Doane, Swecker & Mathis, LLP

[57] ABSTRACT

The invention is directed to a vehicle passenger restraint system having a restraint device for protecting a passenger in a vehicle. The system includes an acceleration sensor for sensing an acceleration of the vehicle, and an A/D converter for converting an output of the acceleration sensor into a digital signal indicative of the acceleration of the vehicle. A wavelet transform processor transforms the output of the A/D converter by a wavelet function into a wavelet coefficient. The wavelet function is provided on the basis of a mother wavelet function localized in time, scaled in response to a scale parameter, and shifted in response to a shift parameter indicative of a time localization. A speed variation computing unit sets a first condition when the wavelet coefficient transformed by the wavelet transform processor exceeds a predetermined value, and integrates the output of the A/D converter for a predetermined period to provide a speed variation. And, an actuator sets a second condition when the speed variation provided by the speed variation computing unit exceeds a predetermined level. Then, the actuator actuates the restraint device when both of the first and second conditions are set. The wavelet transform processor may be performed in accordance with the Infinite Impulse Response.

6 Claims, 13 Drawing Sheets

F I G. 13
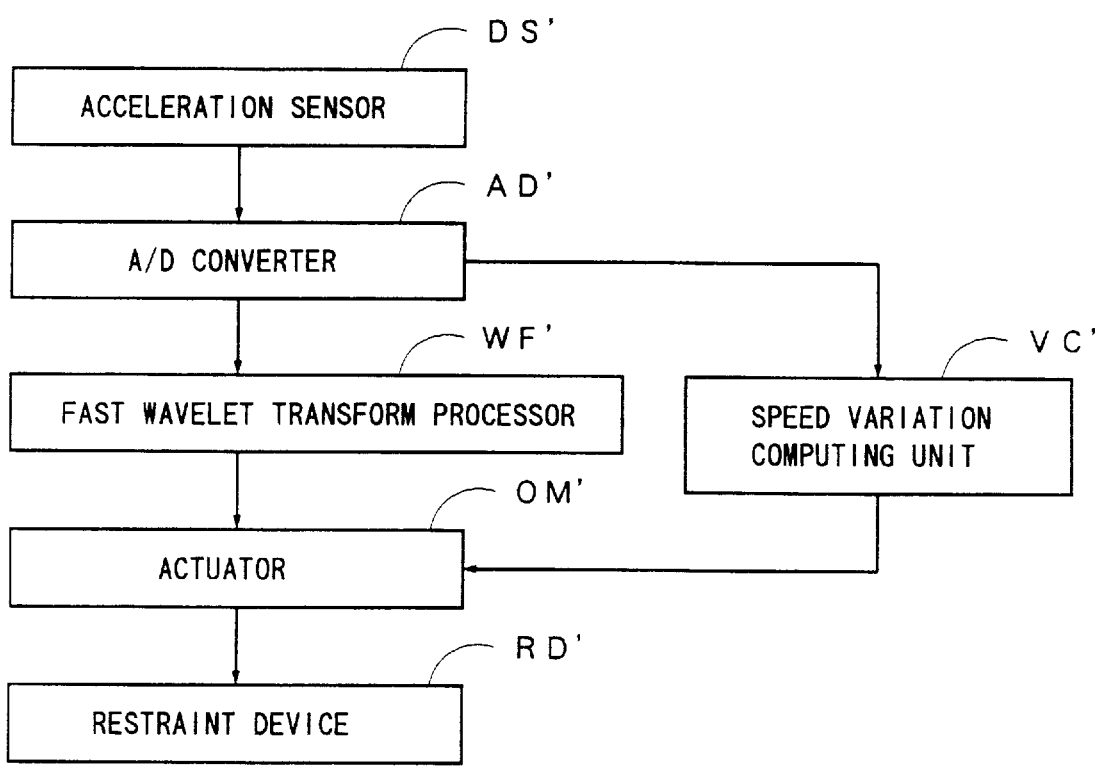

FIR

IIR

VEHICLE PASSENGER RESTRAINT SYSTEM

BACKGROUND OF THE INVENTION

1. Field of the Invention

The present invention relates to a vehicle passenger restraint system for protecting a passenger in a vehicle, such as an air bag system, a seat belt pre-loader or the like, and more particularly to the restraint system using a wavelet function provided on the basis of a mother wavelet function which is localized in time.

2. Description of the Prior Arts

Recently, an air bag system is installed in a vehicle as a restraint system to supplement a seat belt. That is, the air bag is provided for protecting a driver together with the seat belt in the event of a frontal impact on the vehicle exceeding a predetermined level. According to a conventional air bag system, when an acceleration sensor senses the frontal impact greater than a predetermined threshold level, the air bag inside a steering wheel is momentarily inflated to reduce the shock to the driver.

In that restraint system, it is necessary to detect the impact on the vehicle accurately and rapidly, so that a study has been made to provide a method for detecting an impact force, a condition of the impact, or the like, accurately in response to an acceleration signal sensed by the acceleration sensor. In Japanese Patent Laid-open Publication No. 6-107112, for example, proposed is a method for detecting the magnitude of the impact by means of the acceleration sensor which is disposed on the frontal portion of the vehicle, dividing the magnitude of the impact (i.e., the magnitude of the acceleration) into a plurality of segments, providing a weight on each segment, multiplying the acceleration in each segment with the weight on each segment to provide an integral value, and actuating the restraint system on the basis of the integral value.

Also, in that restraint system, an improvement on the acceleration sensor is required, and also required is an improvement on the method for detecting the impact force, the condition of the impact, or the like, accurately. In Japanese Patent Laid-open publication No. 4-358945, for example, it is proposed to detect a collision accurately even in the case where a large delay in output of the acceleration signal occurred due to an oblique impact, a pole impact, or the like. There is proposed an actuator for the vehicle restraint system, wherein the integral value of the acceleration signal for a predetermined period of integration and a differential value of the acceleration signal at a predetermined time in the period of integration are summed to determine the impact in response to the result of summation.

In the U.S. Pat. No. 5,185,701, it is proposed to provide a method for distinguishing between different types of vehicle crashes by determining which frequency components are present in a signal from a deceleration sensor upon the occurrence of a vehicle crash condition. Also, in the U.S. Pat. No. 5,034,891, it is proposed to provide a method and apparatus for electrically controlling an actuatable passenger restraint system which includes filter means connected to sensing means for providing a signal having a value when the sensing means provides a signal that includes particular frequency components. Furthermore, in the U.S. Pat. No. 5,065,322, it is proposed to provide a method and apparatus for electrically controlling an actuatable passenger restraint system which actuates the system only upon a frequency domain summation algorithm indicating the occurrence of a predetermined type of crash. It is proposed in the U.S. Pat. No. 5,036,467 to provide a method and apparatus for electrically-controlling an actuatable passenger restraint system which actuates the system only upon a frequency domain integration and summation algorithm indicating the occurrence of a predetermined type of crash. As one aspect of the invention disclosed in the last United States Patent for example, a method is provided for controlling actuation of a passenger restraint system in a vehicle. The method includes the steps of providing a time domain vibratory electric signal having frequency components indicative of a vehicle crash condition, transforming the time domain vibratory electric signal over at least two time intervals into associated frequency domain signals, integrating each of the frequency domain signals, summing the integrals of the frequency domain signals, and actuating the passenger restraint system when the sum of the integrals of the frequency domain signals indicates a predetermined type of vehicle crash is occurring.

According to the above-described methods and apparatuses for detecting the impact, however, the differential value or integral value of the acceleration (deceleration), the sum of integral value of the particular frequency or the like has been used, so that the time component may cause changes in various conditions such as the direction of the impact, to result in an error or delay in detecting the impact, which can not be recovered to ensure a desired property by an ordinary way of recovery such as a way for eliminating a noise. In the method and apparatus as described in the United States Patents listed above, the frequency component of the vibratory electric signal caused in collision is to identified. Thus, as far as a target to be controlled includes the frequency component, it is difficult to cancel any noise completely, so that it may cause a delay in time when determining the impact, depending upon the condition of the impact. Even if well known Fourier transform was used for analyzing the acceleration signal, it would be difficult to measure accurately the time when a particular frequency component generates, so that it would be difficult to provide an accurate time for inflating the air bag.

In a field of analyzing signals, as a method for dividing or combining those signals, a wavelet transform is getting popular recently for use in various fields such as audio, display or the like, as disclosed in Japanese Patent Laid-open Publication No.4-275685. It is known that the wavelet transform is a method for dividing an input signal into wavelets as its components, and re-configuring the original input signal as a linear coupling of the wavelets. The wavelet transform is effectively used for analyzing an unsteady state, such as a state transition or the like, and has as its base a mother wavelet function, to which a scale transform and a shift transform are performed. The mother wavelet function is a square-integrable function which is localized in time, although the base has to be the one to be bounded, or the one to be attenuated rapidly in a remote area. Furthermore, the mother wavelet function may be used effectively for identifying a position of a singular point, because it has various characteristics, such that the base is analogous, that the direct current component is not included, and that a dissector rate for analysis can be provided freely.

Therefore, one of the inventors of the present application have proposed a method for accurately detecting the impact on the vehicle through the wavelet transform, without being affected by noise, and irrespective of conditions of the impact, in the U.S. patent application Ser. No. 08/621,249, now U.S. Pat. No. 5,667,244, and its corresponding Japanese Patent Application which is published on Oct. 8, 1996, as Japanese Patent Laid-open Publication No. 8-258665.

According to this method, it is easy to distinguish the magnitude of the impact applied when the vehicle collides at a relatively low speed, from the impact applied when the vehicle collides at a relatively high speed, for example. However, when the vehicle travels on a rough road, the output of the acceleration sensor will include a vibratory component to a large extent. Therefore, a lot of scale parameters have to be used for the wavelet operation, so as to detect or determine the rough road correctly for a fail-safe purpose. In other words, when the wavelet transform is performed to provide the wavelet coefficient, the complexity in determining the impact, or the complexity of computation might be increased. Furthermore, when a signal is processed to determine the vehicle collision, the analogue signal output from the the acceleration sensor is sampled for a certain period. If the sampling time is set roughly, therefore, the wavelet coefficient will be varied, so that a desired performance might not be achieved due to the variation of the wavelet coefficient.

SUMMARY OF THE INVENTION

Accordingly, it is an object of the present invention to provide a vehicle passenger restraint system having effective means for reducing the complexity of computation when detecting an impact on a vehicle.

It is another object of the present invention to improve the performance in detecting the impact on the vehicle.

In accomplishing the above and other objects, a vehicle passenger restraint system has a restraint device for protecting a passenger in a vehicle, and includes acceleration sensing means for sensing an acceleration of the vehicle, A/D converting means for converting an output of the acceleration sensing means into a digital signal indicative of the acceleration of the vehicle, and wavelet transforming means for transforming an output of the A/D converting means by a wavelet function into a wavelet coefficient. The wavelet function is provided on the basis of a mother wavelet function localized in time, scaled in response to a scale parameter, and shifted in response to a shift parameter indicative of a time localization. The system further includes speed variation computing means for setting a first condition when the wavelet coefficient transformed by the wavelet transforming means exceeds a predetermined value, and integrating the output of the A/D converting means for a predetermined period to provide a speed variation. And, actuating means is provided for setting a second condition when the speed variation provided by the speed variation computing means exceeds a predetermined level, and actuating the restraint device when both of the first and second conditions are set.

Preferably, the system further includes weighting means for weighting the output of the A/D converting means when the acceleration sensing means senses a signal having a directional component opposite to an impact on the vehicle.

The system may further include filter means for filtering the output of the acceleration sensing means. The wavelet transforming means is adapted to transform the output of the filter means into the wavelet coefficient.

The system may include fast wavelet transforming means for transforming an output of the A/D converting means by the wavelet function into the wavelet coefficient. The fast wavelet transforming means is adapted to transform the output of the A/D converting means into the wavelet coefficient in accordance with the Infinite Impulse Response. The speed variation computing means is, therefore, adapted to set the first condition when the wavelet coefficient transformed by the fast wavelet transforming means exceeds a predetermined value.

The system may substitute the speed variation computing means for the fast wavelet transform means. That is, a plurality of fast wavelet transforming means may be provided for transforming the output of the A/D converting means by the wavelet function into the wavelet coefficient, respectively. And, the actuating means is adapted to actuate the restraint device when the wavelet coefficient transformed by each of the fast wavelet transforming means exceeds a predetermined value provided for each of the fast wavelet transforming means.

BRIEF DESCRIPTION OF THE DRAWINGS

The above stated objects and following description will become readily apparent with reference to the accompanying drawings, wherein like reference numerals denote like elements, and in which:

FIG. 13 is a schematic block diagram showing a basic construction of a vehicle passenger restraint system according to a second embodiment of the present invention;

DESCRIPTION OF THE PREFERRED EMBODIMENTS

Figure 1:
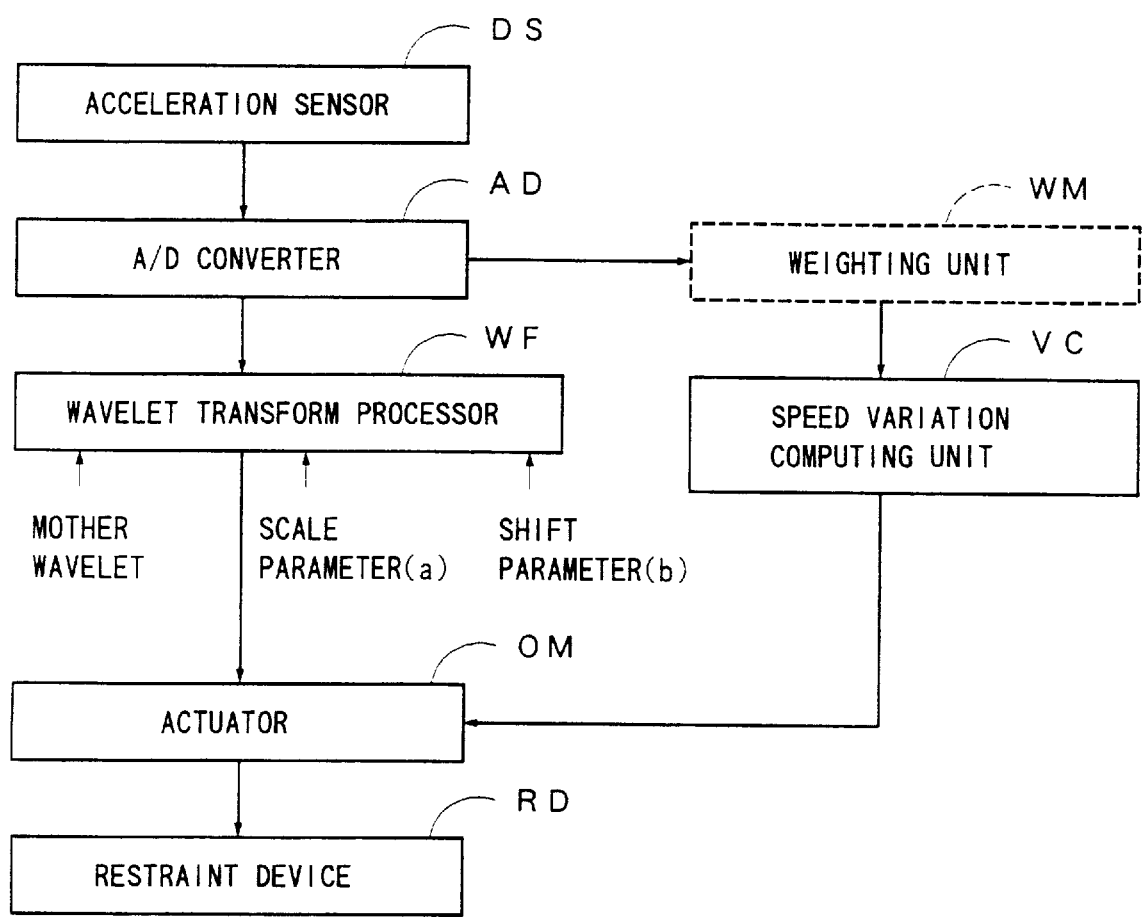
FIG. 1 is a schematic block diagram showing a basic construction of a vehicle passenger restraint system according to an embodiment of the present invention.

Referring to FIG. 1, there is schematically illustrated a vehicle passenger restraint system according to an embodiment of the present invention. An acceleration sensor (DS) is provided for sensing an acceleration of a vehicle (not shown) and an A/D (analog-to-digital) converter (AD) is provided for converting the output signal of the acceleration sensor (DS) into a digital signal indicative of the acceleration of the vehicle. A wavelet transform processor (WF) is provided for transforming the output signal of the A/D converter (AD) into a wavelet coefficient. The wavelet function is provided on the basis of a mother wavelet function, scaled in response to a scale parameter (a), and shifted in response to a shift parameter (b) which indicates a time localization. A speed variation computing unit (VC) is adapted to set a first condition when the wavelet coefficient exceeds a predetermined coefficient, and adapted to integrate the output of the A/D converter (AD) for a predetermined period. And, an actuator (OM) is adapted to set a second condition when the speed variation exceeds a predetermined speed, and adapted to actuate a restraint device (RD) to protect the vehicle passenger, when both of the first and second conditions are set. Thus, by means of the combination of the wavelet coefficient and the speed variation, the complexity of the wavelet transform, or the complexity of computation will be reduced when the impact is detected.

Figure 15:
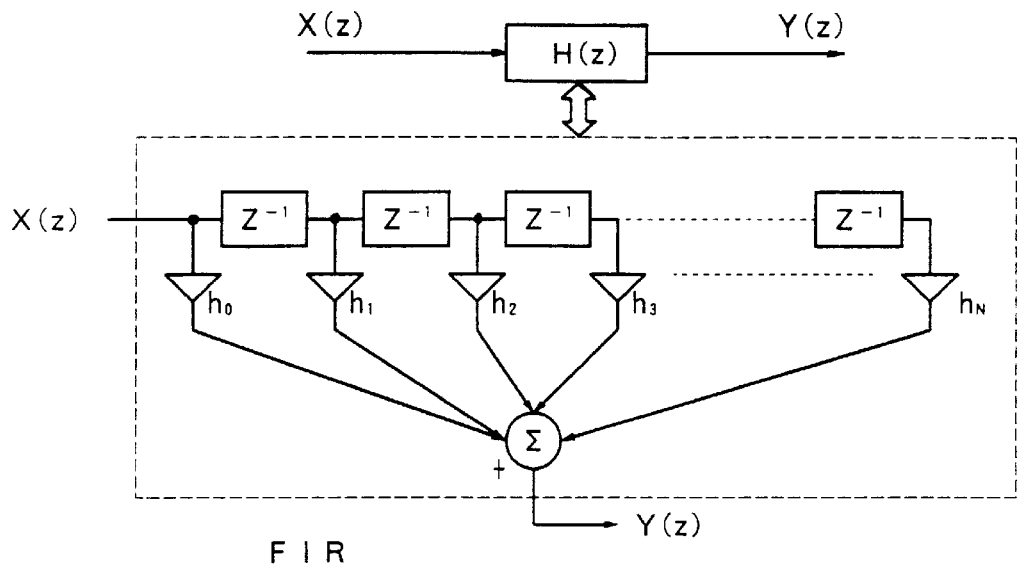
FIG. 15 is a schematic block diagram showing a Finite Impulse Response system.

According to the present embodiment, the operation of the wavelet transform is performed in accordance with the Finite Impulse Response (FIR) as shown in FIG. 15. In the case where the vehicle travels on a rough road, the output of the acceleration sensor (DS) vibrates. Therefore, the system preferably further includes a weighting unit (WM) for weighting the output of the A/D converter (AD) when the acceleration sensor (DS) senses a signal having a directional component opposite to the impact on the vehicle. By means of the weighting unit (WM), the signal indicative of the vehicle acceleration which is not used for determining the impact on the vehicle, is weighted, so that the speed variation will be lowered. Consequently, the threshold level for determining the impact will be lowered comparing with the prior device to shorten the duration for determining the impact. The system may further include a filter (not shown) for filtering the output of the acceleration sensor (DS), so that the wavelet transform processor (WF) transforms the output of the filter into the wavelet coefficient.

Figure 2:
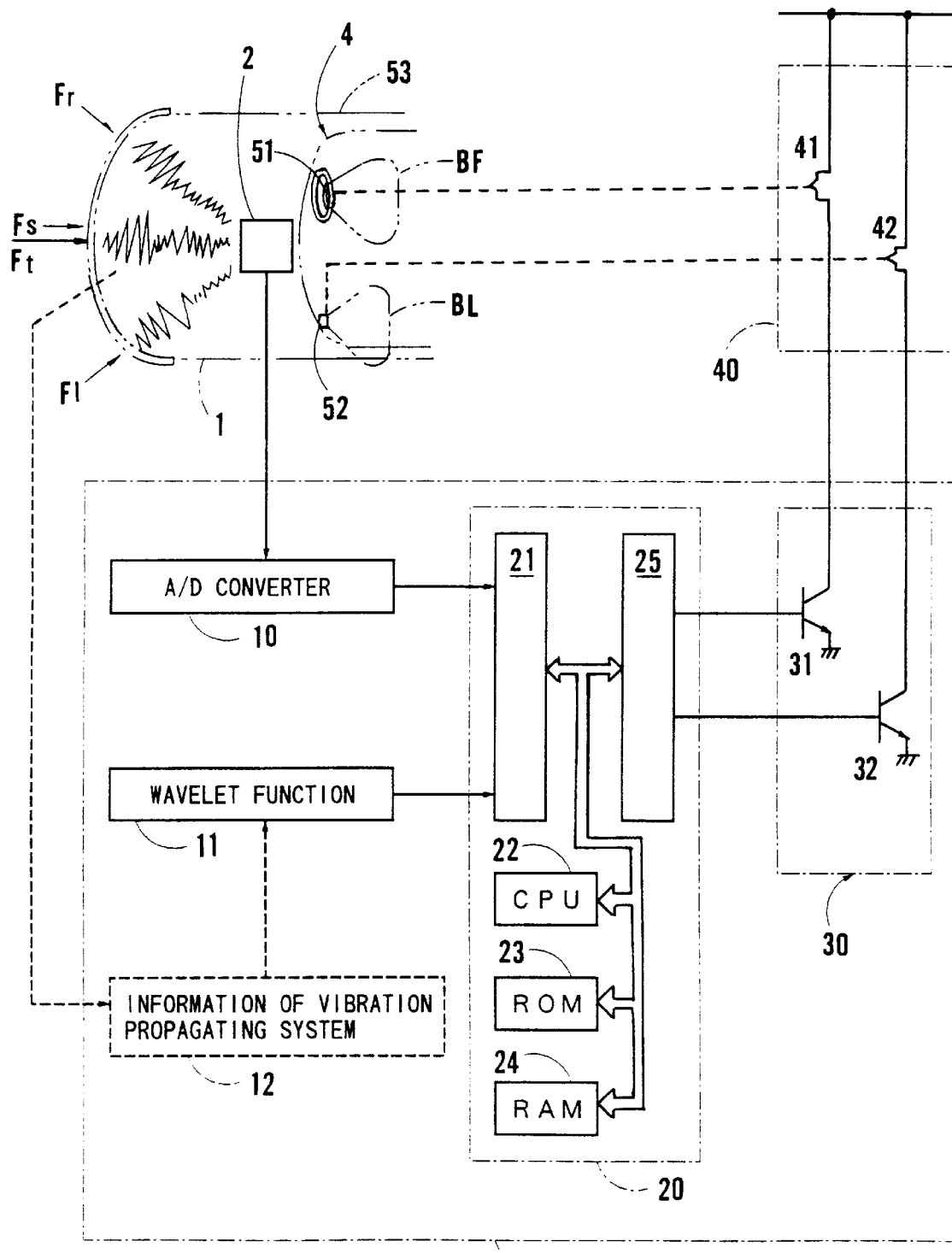
FIG. 2 is a schematic drawing of overall construction of an air bag system according to an embodiment of the present invention.
Figure 8:
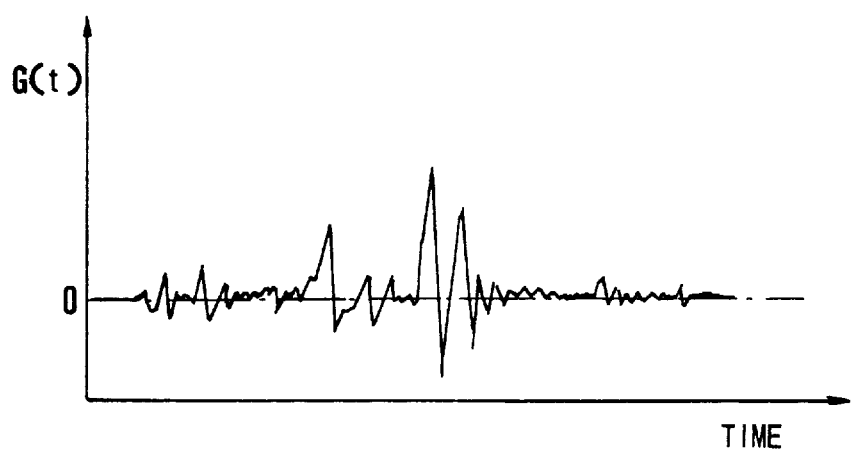
FIG. 8 is a diagram showing a waveform of a signal output from an acceleration sensor when a vehicle travels on a rough road according to an embodiment of the present invention.
Figure 19:
FIG. 19 is a diagram showing a signal which is generated by a head-on collision of a vehicle running at a low speed, and fed into an acceleration sensor according to the present invention.
Figure 20:
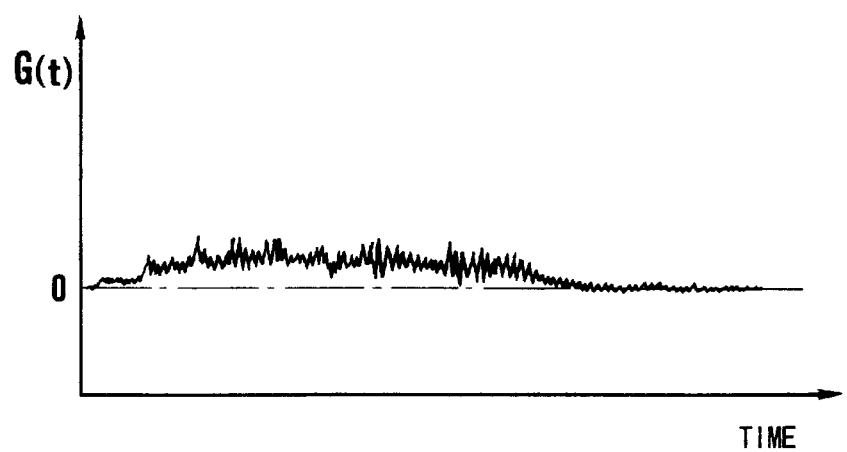
FIG. 20 is a diagram showing a signal which is generated by an irregular collision of a vehicle running at a low speed, and fed into an acceleration sensor according to the present invention.
Figure 21:
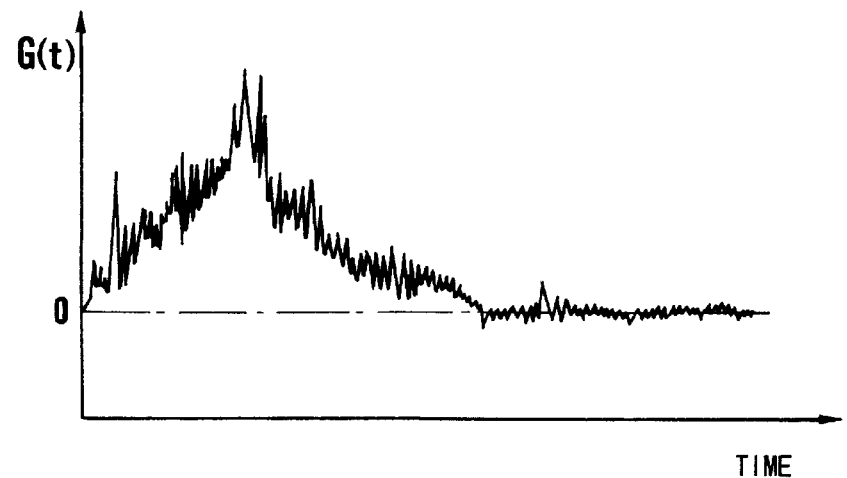
FIG. 21 is a diagram showing a signal which is generated by a head-on collision of a vehicle running at a high speed, and fed into an acceleration sensor according to the present invention.

More specifically, the details of the embodiment disclosed in FIG. 1 are illustrated in FIG. 2, wherein an acceleration sensor 2 is disposed on a certain place, e.g., a central portion of a vehicle 1, and electrically connected to an electronic control unit 3 for controlling an air bag device 4. The air bag device 4 includes a pair of air bags BF, BL as shown in FIG. 2 in their inflated conditions by two-dotted chain lines, and inflaters 51, 52 for inflating them. The acceleration sensor 2 is arranged to output a signal responsive to an acceleration (or a deceleration) of the vehicle 1. Any types of sensor may be employed for the acceleration sensor 2, such as that of a mechanical type using a mass-rotor, the one having a strain gauge made of a semi-conductor, or the like, provided that they output electric signals indicative of the acceleration. Or, may be employed such a sensor that outputs a signal only in the case where the deceleration of the vehicle 1 reaches the value corresponding to an impact force more than a predetermined level when a vehicle collision occurred. With respect to the output signal from the acceleration sensor 2, the acceleration signal has a negative value, while the deceleration signal, which is generated in case of the vehicle collision, has a positive value. FIGS. 19–21 illustrate an output characteristic of the acceleration sensor 2 which outputs continuous analog signals. FIG. 19 shows its characteristic in the case where a head-on collision was caused when the vehicle 1 was running at a relatively low speed, so that the air bag device 4 was inoperative. FIG. 20 shows its characteristic when an offset collision or an oblique collision was caused. In this case, air bags BF, BL must be inflated. FIG. 21 shows its characteristic in the case where the head-on-collision was caused when the vehicle 1 was running at high speed. In this case, the air bags BF, BL are arranged to be inflated depending upon the magnitude of the collision. When the vehicle 1 travels on a rough road, the output of the acceleration sensor 2 vibrates as shown in FIG. 8. In this case, the air bag device 4 is not to be actuated to avoid its malfunction.

Figure 3:
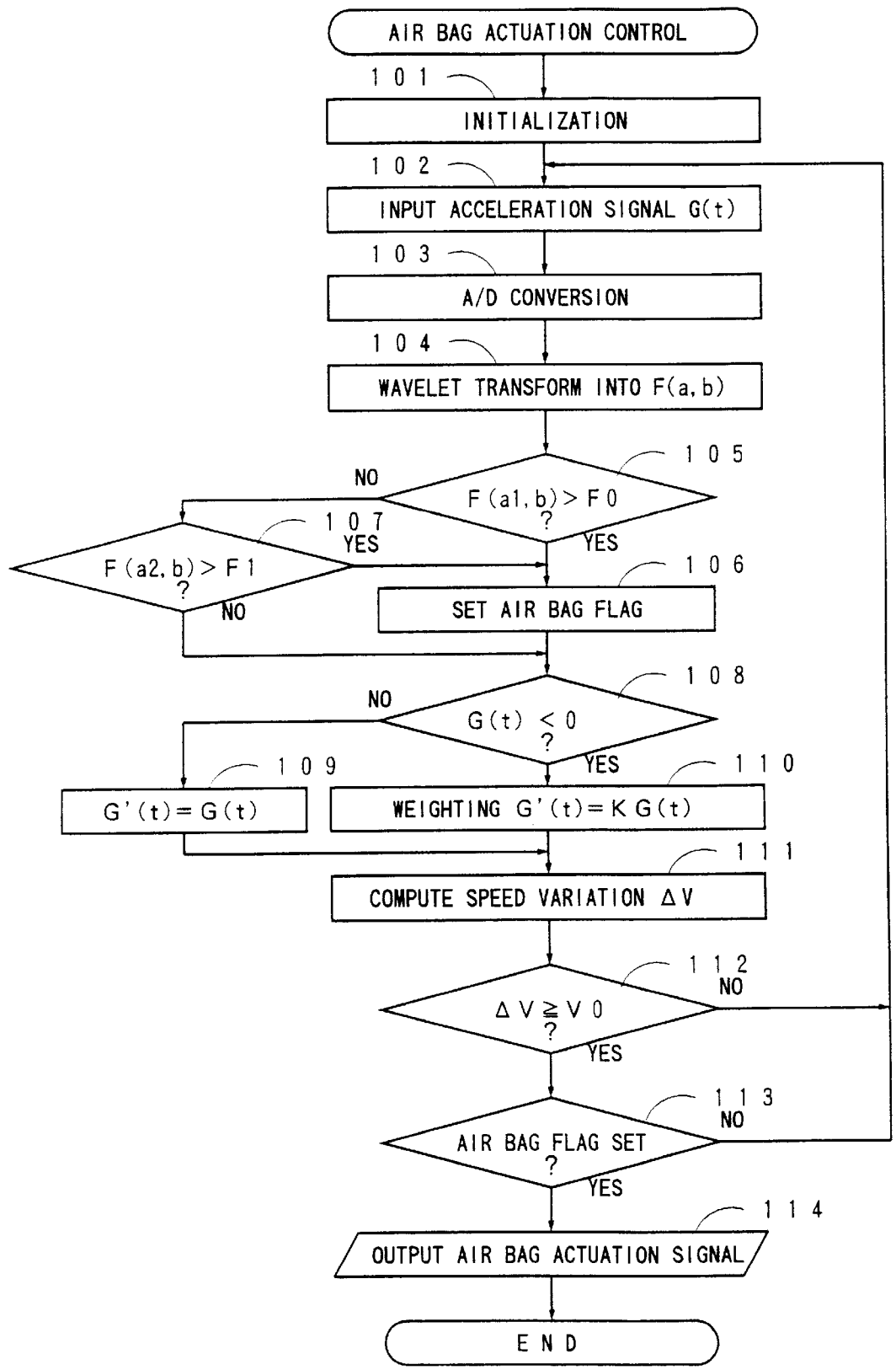
FIG. 3 is a flowchart showing operation of an air bag system according to an embodiment of the present invention.

The acceleration sensor 2 is connected to the electronic control unit 3 in such a manner that the output of the acceleration sensor 2 is fed to a microcomputer 20 through an A/D converter 10. An ignition control circuit 30 is connected to the microcomputer 20 to be driven thereby, so that an ignition device 40 is driven by the ignition control circuit 30. The ignition device 40 includes squibs 41, 42 which ignite the inflaters 51, 52 to inflate the air bag BF which is installed in a steering wheel pad, and the air bag BL which is installed in an instrument panel in front of a passenger sheet, respectively. The microcomputer 20 is constituted in such a conventional manner that an input port 21, a central processing unit (CPU) 22, a read only memory (ROM) 23, a random access memory (RAM) 24, an output port 25 and etc. are connected to each other through a common bas. A signal is input from the A/D converter 10 to the input port 21, and computed at the CPU 22, and then output from the output port 25 to the ignition control circuit 30. In the microcomputer 20, the ROM 23 memorizes a program corresponding to flowcharts as shown in FIG.3, the CPU 22 executes the program while an ignition switch (not shown) is closed, and the RAM 24 temporarily memorizes variable data needed to execute the program.

The ignition control circuit 30 includes switching transistors 31, 32, for example, which are turned on or off in response to outputs from the microcomputer 20, so as to heat up the squibs 41, 42 in the ignition device 40. The inflaters 51, 52 are provided therein with the squibs 41, 42, respectively, and constituted in the same fashion. In each of the inflaters 51, 52, when the respective one of the squibs 41, 42 is heated, ignition agent (not shown) contained in the squib is ignited, so that fire spreads instantaneously to gas generant (not shown), which generates a large amount of gas (e.g., nitrogen gas). The inflaters 51, 52 are provided for supplying the gas to the air bags BF, BL, respectively. The structure and function of each of the inflaters, bags and etc. are the substantially same as those employed in the air bag system already on the market, so that detailed explanation of those is omitted.

According to the method for detecting the impact on the vehicle 1, the acceleration sensor outputs the acceleration signal, to which the wavelet transform is performed. That is, there is provided as a base, a mother wavelet function which is localized with respect to at least a "time" domain, such as Gabor function or the like. Then, by means of a wavelet function which is provided on the basis of the mother wavelet function, the wavelet transform is performed in accordance with a scale parameter (hereinafter, indicated by (a)), which is determined depending upon a type of the vehicle 1, and a shift parameter (indicated by (b)), i.e., a shift in time. In other words, the mother wavelet function is transformed in scale by "a" times in accordance with the scale parameter (a) to provide the wavelet function, by which the signal is transformed into a wavelet coefficient F(a, b) in accordance with the shift parameter (b). Then, a certain scale parameter is set for a predetermined reference scale parameter (a1). On the basis of the condition of the wavelet coefficient F(a, b) with respect to at least the reference scale parameter (a1), or on the basis of the timing for generating the same, the condition (magnitude, direction or the like) of the impact is determined. That is, references for determining the magnitude, direction or the like (e.g., a predetermined level "F0") may be provided against the wavelet coefficient F(a1, b) transformed with respect to the reference scale parameter (a1). The wavelet coefficient F(a1, b) is compared with the reference F0 at the time of determining the condition of the impact. In response to the result of this comparison, the signal indicative of the condition of the impact is output.

Next, the definition of the wavelet transform used in the present invention will be explained hereinafter. The base of the wavelet transform is called a mother wavelet function h(t), which is a square-integrable transform function, and whose norm has been normalized, and which is localized in a time domain, at least. This mother wavelet function h(t) may be defined as the one to satisfy the following formula (1) which indicates that a direct current component (or, mean value) of the signal is zero.

$$\hat{h}(0) = \frac{1}{\sqrt{2\pi}} \int h(t)dt = 0 \qquad (1)$$

Then, the wavelet function is provided by scaling the mother wavelet function by "a" times, and then translating, or shifting its original point by "b", in accordance with the following formula (2):

$$h_{a,b}(t) = \frac{1}{\sqrt{a}} h\left(\frac{t-b}{a}\right) \qquad (2)$$

Therefore, supposing that a function to be analyzed is f(t), the wavelet transform is defined as shown in the following formula (3):

$$F(a,b) = \langle h_{a,b}(t), f(t) \rangle = \int h^*_{a,b}(t)dt \qquad (3)$$

where F(a,b) indicates a wavelet coefficient, < > indicates an inner product, and * indicates a complex conjugate.

The wavelet function used for analyzing something is called an analyzing wavelet (mother wavelet function), for which the Gabor function or the like is employed. For example, Morlet's wavelet, which is one of the Gabor functions, and which is defined in the following formula (4), is known as the analyzing wavelet suitable for analyzing a signal having such a singularity that a differential coefficient is discontinuous.

$$h(t) = \exp(-j\omega_0 t)\exp\left(\frac{-t^2}{2}\right), \omega_0 = 5\sim6 \qquad (4)$$

According to the above-described method for detecting the impact through the wavelet transform, however, a lot of scale parameters have to be provided, so that the wavelet transform has to be made for each of the scale parameters, e.g., scale parameters a1, a2, and etc. As a result, the complexity in performing the wavelet transform will be increased. According to the present invention and its embodiments, therefore, the speed variation is also used for the determination of the impact through the wavelet transform to reduce the complexity in performing the wavelet transform, thereby to improve the determination of the impact.

The program routine executed by the electronic control unit 3 for controlling the air bag system will now be described with reference to FIG. 3. The program routine corresponding to the flowchart as shown in FIG. 3 starts when the ignition switch (not shown) is turned on, so that the program is repeated by a predetermined cycle (e.g., 0.5 ms). With the control unit 3 energized, the program provides for initialization of the system at Step 101 to clear various data for use in determining the impact, and provides predetermined initial values. Then, the program proceeds to Step 102 where an acceleration signal G(t), which is generated in proportion to the magnitude of the acceleration, is output from the acceleration sensor 2. For example, when the vehicle 1 collides to generate the impact, the acceleration sensor 2 outputs the acceleration signal G(t) indicative of a relatively large deceleration, which will be used for the determination of the impact.

Next, the program proceed to Step 103, where the signal output from the acceleration sensor 2 is converted into a digital signal by the A/D converter 10 to be fed into the microcomputer 20 in the form of the aforementioned function f(t). Then, at Step 104, the wavelet transform is performed in accordance with a shift parameter "b" (hereinafter, referred to as a time localization (b)), and a predetermined scale parameter "a" (hereinafter, referred to as a scale (a)), so that a wavelet coefficient F (a, b) is obtained. In other words, the convolution of the function f(t) and the mother wavelet function is performed to compute the sum of products (cf., the formula (3)). That is, the FIR (Finite Impulse Response) process is performed as shown in FIG. 15. The wavelet coefficient F(a1, b) is obtained with respect to the predetermined reference scale parameter (a1). And, the wavelet coefficient F(a1, b) is compared with a predetermined threshold level "F0". In accordance with the scale parameter (a) and a sampling time, the frequency of the computations is determined. According to the present embodiment, the sum of products is computed 33 times for the signal (one datum) output from the acceleration sensor 2, and shifted sequentially in time to obtain the wavelet coefficient.

Figure 4:
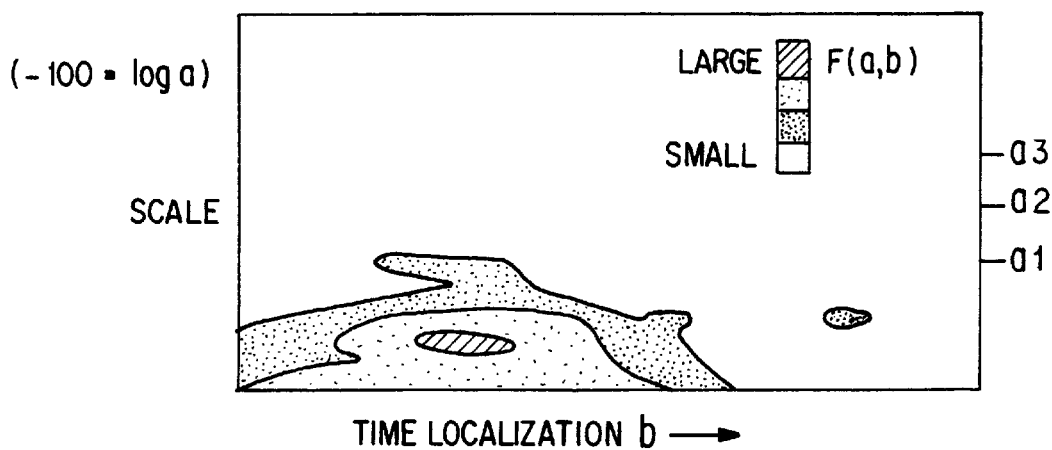
FIG. 4 is a diagram showing a signal which is generated by a head-on collision of a vehicle running at a low speed, and to which a wavelet transform is made according to an embodiment of the present invention.
Figure 5:
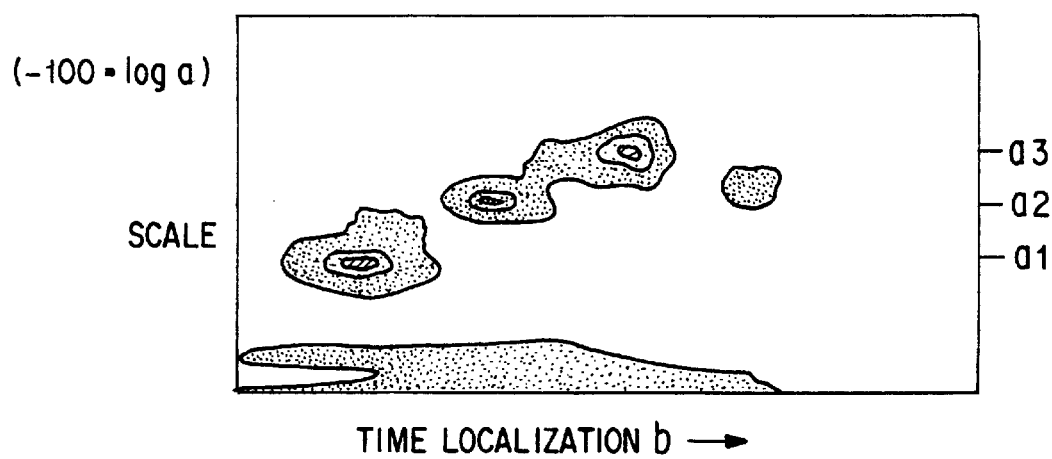
FIG. 5 is a diagram showing a signal which is generated by an irregular collision of a vehicle running at a low speed, and to which a wavelet transform is made according to an embodiment of the present invention.
Figure 6:
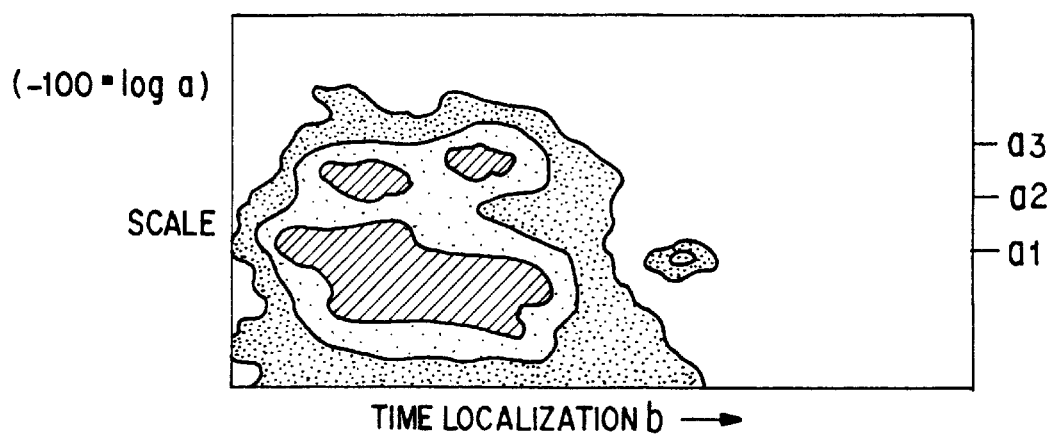
FIG. 6 is a diagram showing a signal which is generated by a head-on collision of a vehicle running at a high speed, and to which a wavelet transform is made according to an embodiment of the present invention.
Figure 7:
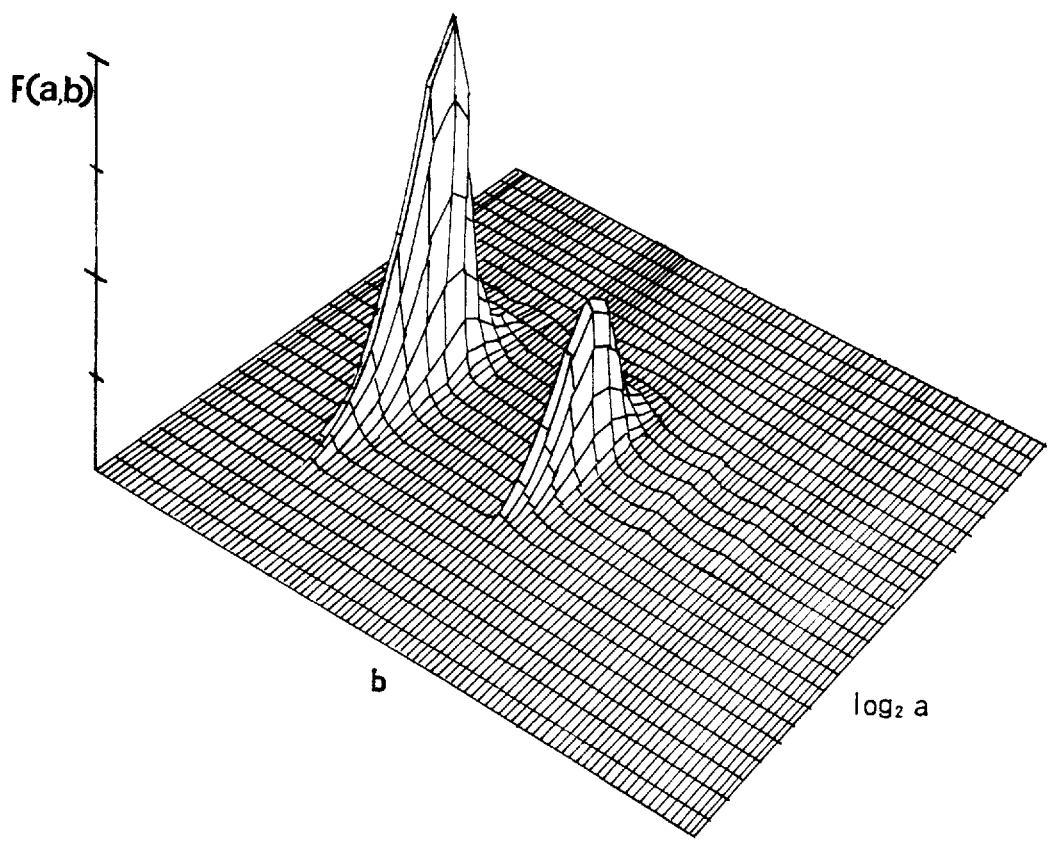
FIG. 7 is a diagram of an example of a wavelet coefficient shown by three-dimension according to the present invention.
Figure 9:
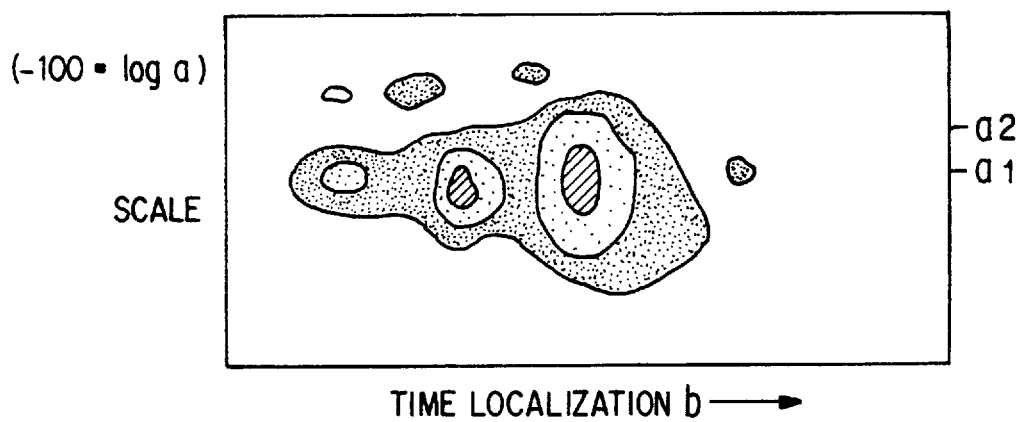
FIG. 9 is a diagram showing a signal having a waveform as shown in FIG. 8 to which a wavelet transform is made according to an embodiment of the present invention.

FIGS. 4–6 illustrate examples of the wavelet coefficient F(a, b) according to the wavelet analysis, in the case where different impacts are applied on the vehicle 1, and FIG. 9 illustrates an example of the wavelet coefficient F(a, b) when the vehicle 1 travels on the rough road. The wavelet coefficient F(a, b) may be illustrated by three-dimension as shown in FIG. 7. In each figure, the scale parameter (a) is indicated by logarithmic value. No figure directly corresponds to any examples as shown in FIGS. 8 and 19–21. The scales (a1), (a2) are examples set as reference data provided for the wavelet transform which is performed in accordance with the flowchart in FIG. 3, and various values may be set in response to the information about the aforementioned vibration propagating systems (characteristics depending upon the type of the vehicle 1).

Referring back to FIG. 3, if it is determined at Step 105 that the wavelet coefficient F(a1, b) is greater than the threshold level "F0", the program proceeds to Step 106, otherwise it proceeds to Step 107. It is determined at Step 107 whether the wavelet coefficient F(a2, b) with respect to the scale (a2) ( a2> a1) is greater than the threshold level "F1". If the wavelet coefficient F(a2, b) exceeds the threshold level "F1", the program proceeds to Step 106 (corresponding to a first condition), where an air bag flag is set for actuating the air bag device 4. Otherwise, the program proceeds to Step 108 where it is further determined if the output G(t) of the acceleration sensor 2 is of a negative value, i.e., when the signal indicative of the acceleration is generated, opposite to the signal indicative of the deceleration which is generated when the vehicle collision occurs.

Figure 10:
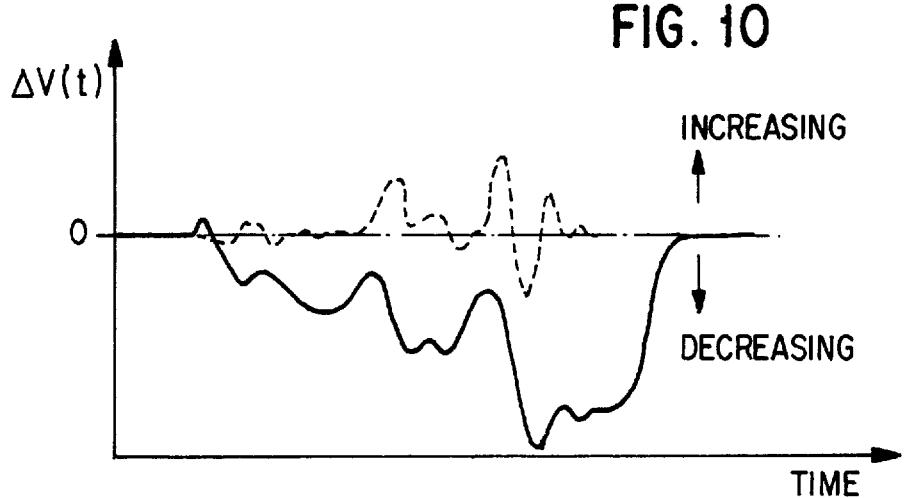
FIG. 10 is a diagram showing signals weighted according to an embodiment of the present invention and a prior device to be compared therewith, when a vehicle travels on a rough road.

If the output G(t) is of the negative value, the program proceeds to Step 110 where the output G(t) is weighted by multiplying it with a predetermined constant value "K" to provide G'(t) (=K·G(t)). When the output G(t) is the signal indicative of the deceleration, it is not weighted, but the program proceeds to Step 109 so as to provide G'(t)=G(t), and proceeds further to Step 111. Thus, in the case where the acceleration signal, which does not indicate that the vehicle speed decreases, is output from the acceleration sensor 2, the signal will be weighted as shown by a solid line in FIG. 10, wherein a phantom line indicates a prior device. Therefore, in the case where the output of the acceleration sensor 2 vibrates as shown in FIG. 8, when the vehicle 1 travels on the rough road, for example, the sensitivity of the restraint system can be reduced to prevent the malfunction of the system.

At Step 111, a speed variation Δ V is obtained by integrating the value G'(t) during a predetermined time period (e.g., 30 ms). Thus, the speed variation Δ V varies with the passage of time. In the case where the output of the acceleration sensor 2 indicates that the vehicle speed increases, i.e., opposite to the vehicle speed decreasing direction, the output of the acceleration sensor 2 is weighted in the accelerating direction, so that the speed variation Δ V will be lowered. As a result, a threshold level for determining the impact can be set to be lowered comparing with the prior device, to operate the restraint system earlier than the prior device. It is determined at Step 112 whether the speed variation Δ V is equal to or greater than a predetermined level V0. If the result is affirmative, the program further proceeds to Step 113 where it is determined whether the air bag flag has been set. If the speed variation Δ V is smaller than the predetermined level V0, the program returns to Step 102. When it is determined that the air bag flag has been set (corresponding to a second condition), the program proceeds to Step 114, otherwise the program returns to Step 102 to repeat the above-described steps.

At Step 114, a signal for actuating the air bag device 4 is output. That is, when the first and second conditions are met, the transistors 31, 32 are turned on to heat up the squib 41, 42. Consequently, igniting agent (not shown) in each of the inflaters 51, 52 is ignited to spread the fire to the gas generant (not shown), which generates a large amount of nitrogen gas. The air bags BF, BL are inflated by the nitrogen gas instantaneously, and spread in front of the vehicle driver and the passenger, respectively, and the program will end at step 115.

Figure 11:
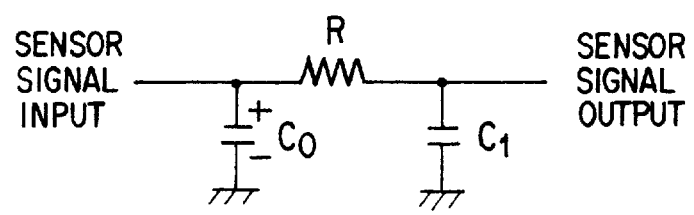
FIG. 11 is a circuit diagram of a filter according to an embodiment of the present invention.
Figure 12A:
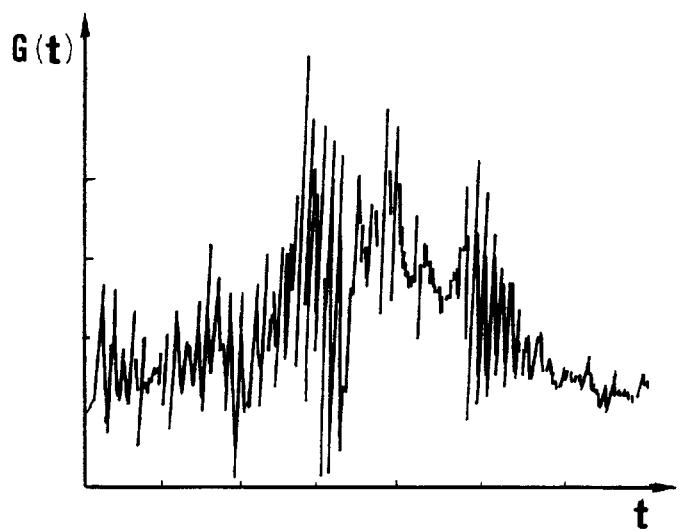
FIG. 12A is a diagram showing an output of an acceleration sensor fed into a filter according to an embodiment of the present invention.
Figure 12B:
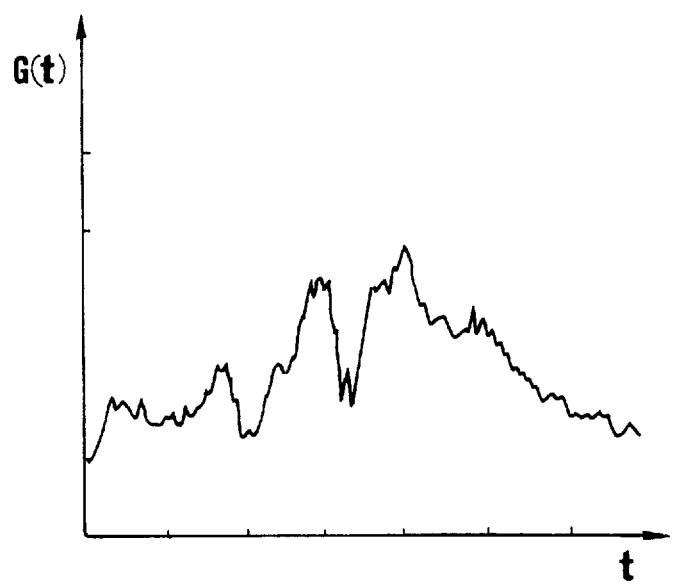
FIG. 12B is a diagram showing an output from a filter according to an embodiment of the present invention.

In the case where the wavelet transform is used in detecting the impact as described above, it is desirable to employ a low-pass filter (LPF) having capacitors (C0), (C1) and a resistor (R) as shown in FIG. 11, for example. When the output of the acceleration sensor 2 as shown in FIG. 12A passes the low-pass filter (LPF), the signal output from the filter (LPF) will be the one as shown in FIG. 12B, so that if the signal as shown in FIG. 12B is used for the wavelet transform, dispersion due to the variation of the sampling time period will be reduced. Furthermore, if the wavelet transform is performed to the signal passed through the low-pass filter (LPF), the detection of the impact will be improved to provide a high performance. The filter (LPF) may be formed by either hardware or software.

Figure 14:
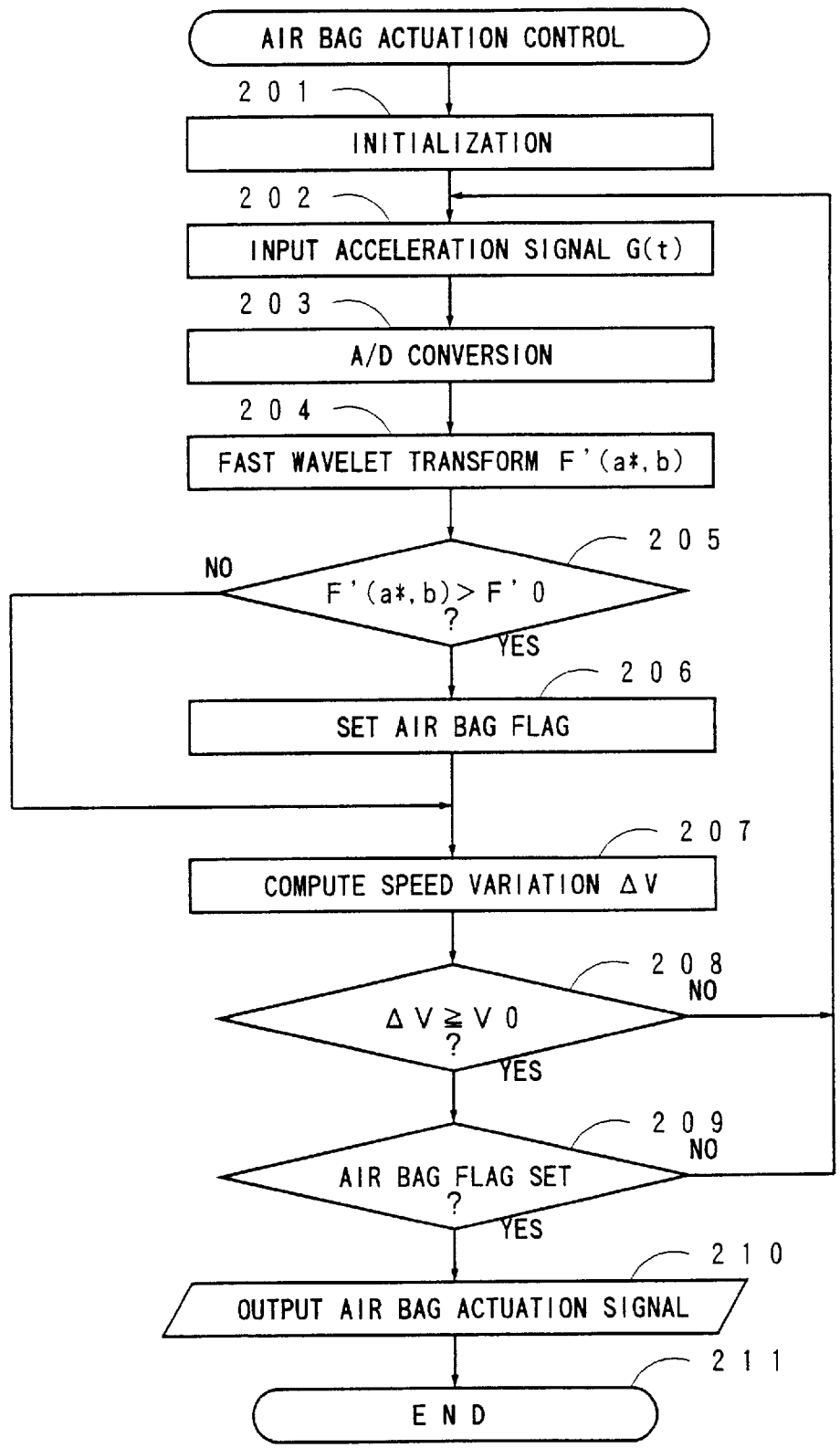
FIG. 14 is a flowchart showing operation of an air bag system according to the second embodiment of the present invention.

FIG. 13 illustrates a second embodiment of the present invention, and FIG. 14 is a flowchart showing the operation of the second embodiment. In FIG. 3, a vehicle passenger restraint system has a restraint device (RD') for protecting a passenger in a vehicle (not shown). The system includes an acceleration sensor (DS') for sensing an acceleration of the vehicle, an A/D converter (AD') for converting an output of the acceleration sensor into a digital signal indicative of the acceleration of the vehicle. A fast wavelet transform processor (WF') is adapted to transform an output of the A/D converter (AD') by the wavelet function into the wavelet coefficient in accordance with the Infinite Impulse Response (IIR). A speed variation computing unit (VC) is adapted to set a first condition when the wavelet coefficient transformed by the fast wavelet transform processor (WF') exceeds a predetermined value, and adapted to integrate the output of the A/D converter (AD') for a predetermined period to provide a speed variation. And, an actuator (OM') is adapted to set a second condition when the speed variation provided by the speed variation computing unit (VC') exceeds a predetermined level, and adapted to actuate the restraint device (RD') when both of the first and second conditions are set. In this embodiment, therefore, the wavelet transform is performed in accordance with the IIR system, the complexity of computation can be reduced comparing with the complexity of computation in accordance with the FIR system.

Figure 16:
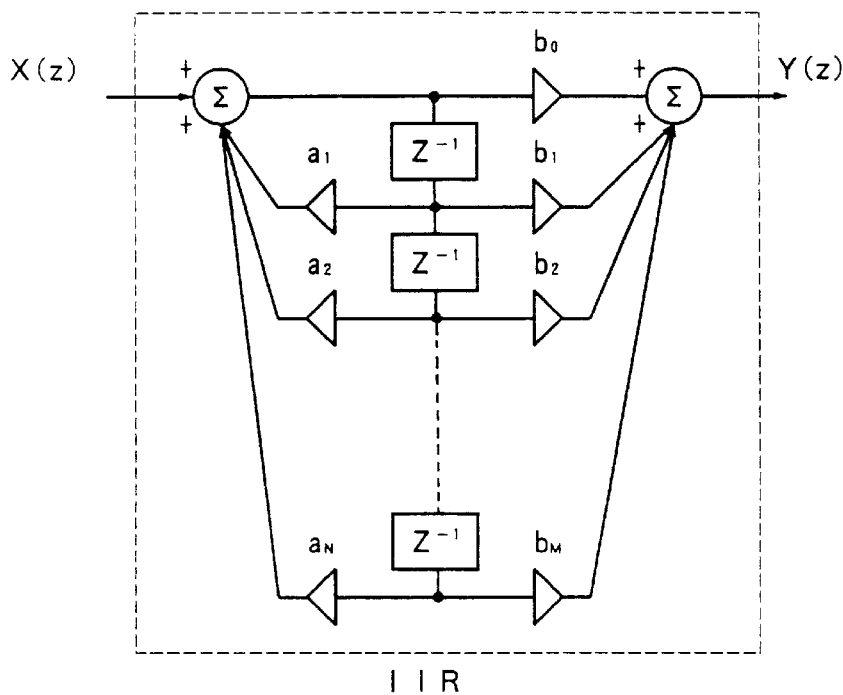
FIG. 16 is a schematic block diagram showing an Infinite Impulse Response system.

In FIG. 4, Steps 201–203 are substantially the same as Steps 101–103 in FIG. 3, and Steps 207–211 are substantially the same as Steps 111–115 in FIG. 3. In this embodiment, at Step 204 is performed a fast wavelet transform operation, which employs an IIR system as shown in FIG. 16 and operated in accordance with the following formula, in stead of the FIR system shown in FIG. 15:

$$F'_{a,\ b}(nt) = a_0 f(nt) + a_1 f[(n-1)\ t] \ldots + a_N f[(n-N)t] + b_1 F'_{a,\ b}[(n-1)\ t] + b_2 F'_{a,\ b}[(n-2)t] \ldots + b_M F'_{a,\ b}[(n-M)\ t] \quad (5)$$

When the order of the above formula is set as "4" in this embodiment, the sum of products computation will be performed 9 times. Accordingly, the computing time will be shortened to enable the fast operation, the memory for memorizing the result will be reduced, and the substantially same performance as the FIR system can be obtained as follows:

| COLLISION TYPE | DETECTING TIME (ms) | |
|---|---|---|
| | EXAMPLE 1 | EXAMPLE 2 |
| 12 km/h head-on | OFF | OFF |
| 20 km/h head-on | 35 | 36 |
| 25 km/h oblique | 26 | 27 |
| 50 km/h head-on | 13 | 15 |
| rough road | OFF | OFF |

In the above table, comparing the detecting time in each collision type between an Example 1 in which the wavelet transform is performed in accordance with the FIR system, and an Example 2 in which the wavelet transform is performed in accordance with the IIR system, the response property is almost the same, while the restraint system does not work at a speed as low as 10 km/h, nor in case of a rough road according to both of the Examples. Thus, the load of computation in the IIR system will be smaller than the load of computation in the FIR system.

Figure 17:
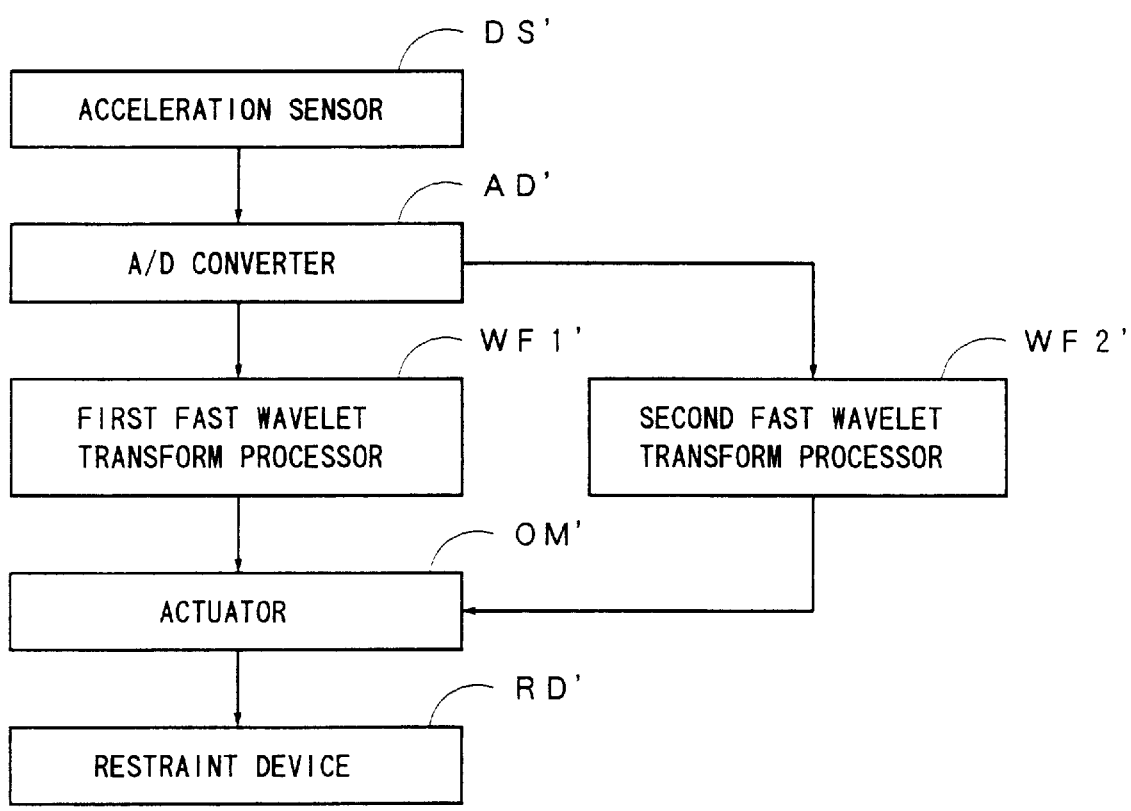
FIG. 17 is a schematic block diagram showing a basic construction of a vehicle passenger restraint system according to a third embodiment of the present invention.
Figure 18:
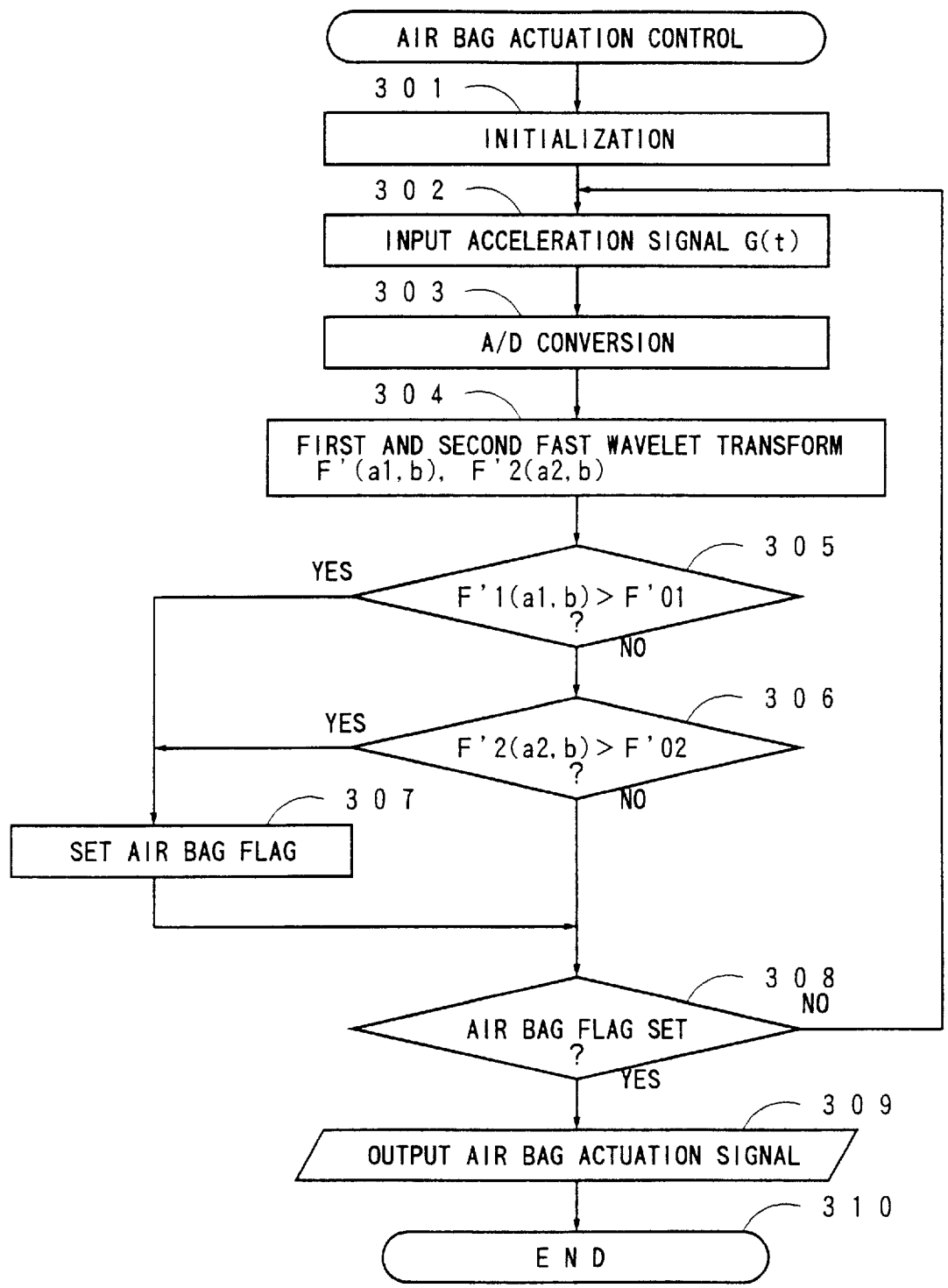
FIG. 18 is a schematic block diagram showing a basic construction of a vehicle passenger restraint system according to a third embodiment of the present invention.

FIG. 17 illustrates a third embodiment of the present invention, and FIG. 18 is a flowchart showing the operation of the third embodiment. In FIG. 17, a vehicle passenger restraint system has the restraint device (RD'), the acceleration sensor (DS') and the A/D converter (AD'), as in the embodiment in FIG. 13. In this system, a first and second fast wavelet transform processors (WF1'), (WF2') are provided for transforming the output of the A/D converter (AD') by the wavelet function into the wavelet coefficient, respectively. Each of the fast wavelet transform processors (WF1'), (WF2') is adapted to transform the output of the A/D converter (AD') into the wavelet coefficient in accordance with the Infinite Impulse Response. And, an actuator (OM') is adapted to actuate the restraint device (RD') when the wavelet coefficient transformed by each of the fast wavelet transform processors (WF1'), (WF2') exceeds a predetermined value provided for each of the fast wavelet transform processors.

As shown in FIG. 18, therefore, a second fast wavelet operation is performed in accordance with the IIR system using the formula (5), in stead of computing the speed variation $\Delta V$ in FIG. 14. That is, in the case where the wavelet coefficient F1'(a1,b) obtained by the first fast wavelet operation performed exceeds a first predetermined value F'01, or the wavelet coefficient F2'(a2,b) obtained by the second fast wavelet operation performed exceeds a second predetermined value F'02, then the restraint system is actuated. The first and second predetermined values are to be set in advance, on the basis of the characteristics of the vehicle. In this case, with the order of "4", the sum of products computation will be executed 18 times, so that the computing time will be shortened to enable the fast operation. Although the fast wavelet operation is performed two times according to the embodiment as shown in FIG. 18, the number of the fast wavelet operation is not limited to two times.

According to the above embodiments, therefore, by using the wavelet transform in detecting the impact on the vehicle, it will become possible to define a characteristic of the acceleration signal as viewed from a time, and define its discontinuous significant point correctly. With the determination through the speed variation combined with the determination through the wavelet coefficient, the complexity in performing the wavelet transform will be reduced when the impact is detected.

In the case where the acceleration sensor 2 outputs the signal which indicates that the vehicle speed is increasing, against the vehicle speed decreasing direction, the speed variation $\Delta V$ is weighted in the accelerating direction, so that the speed variation $\Delta V$ will be lowered. Accordingly, the threshold level for determining the impact will be lowered comparing with the prior device to shorten the duration for determining the impact.

Furthermore, if the wavelet transform is performed to the output signal of the acceleration sensor 2 passed through the low-pass filter (LPF), dispersion due to the variation of the sampling time period will be reduced, so that the detection of the impact will be improved to provide a high performance. In the case where the wavelet transform is performed in accordance with the IIR system, the complexity of computation can be reduced comparing with the complexity of computation wherein the wavelet transform is performed in accordance with the FIR system.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A vehicle passenger restraint system having a restraint device for protecting a passenger in a vehicle, comprising:

acceleration sensing means for sensing an acceleration of said vehicle;

A/D converting means for converting an output of said acceleration sensing means into a digital signal indicative of the acceleration of said vehicle;

wavelet transforming means for transforming an output of said A/D converting means by a wavelet function into a wavelet coefficient, the wavelet function being provided on the basis of a mother wavelet function localized in time, scaled in response to a scale parameter, and shifted in response to a shift parameter indicative of a time localization;

speed variation computing means for setting a first condition when the wavelet coefficient transformed by said wavelet transforming means exceeds a predetermined value, and integrating the output of said A/D converting means for a predetermined period to provide a speed variation; and actuating means for setting a second condition when the speed variation provided by said speed variation computing means exceeds a predetermined level, and actuating said restraint device when both of the first and second conditions are set.

2. The vehicle passenger restraint system as claimed in claim 1, further comprising:

weighting means for weighting the output of said A/D converting means when said acceleration sensing means senses a signal having a directional component opposite to an impact on said vehicle.

3. The vehicle passenger restraint system as claimed in claim 1, further comprising:

filter means for filtering the output of said acceleration sensing means, said wavelet transforming means transforming the output of said filter means into the wavelet coefficient.

4. The vehicle passenger restraint system as claimed in claim 1, wherein said wavelet transforming means transforms the output of said A/D converting means into the wavelet coefficient in accordance with the Finite Impulse Response.

5. A vehicle passenger restraint system having a restraint device for protecting a passenger in a vehicle, comprising:

acceleration sensing means for sensing an acceleration of said vehicle;

A/D converting means for converting an output of said acceleration sensing means into a digital signal indicative of the acceleration of said vehicle;

fast wavelet transforming means for transforming an output of said A/D converting means by a wavelet function into a wavelet coefficient, the wavelet function being provided on the basis of a mother wavelet function localized in time, scaled in response to a scale parameter, and shifted in response to a shift parameter indicative of a time localization, said fast wavelet transforming means transforming the output of said A/D converting means into the wavelet coefficient in accordance with the Infinite Impulse Response;

speed variation computing means for setting a first condition when the wavelet coefficient transformed by said fast wavelet transforming means exceeds a predetermined value, and integrating the output of said A/D converting means for a predetermined period to provide a speed variation; and actuating means for setting a second condition when the speed variation provided by said speed variation computing means exceeds a predetermined level, and actuating said restraint device when both of the first and second conditions are set.

6. A vehicle passenger restraint system having a restraint device for protecting a passenger in a vehicle, comprising:

acceleration sensing means for sensing an acceleration of said vehicle;

A/D converting means for converting an output of said acceleration sensing means into a digital signal indicative of the acceleration of said vehicle;

a plurality of fast wavelet transforming means for transforming an output of said A/D converting means by a wavelet function into a wavelet coefficient, respectively, the wavelet function being provided on the basis of a mother wavelet function localized in time, scaled in response to a scale parameter, and shifted in response to a shift parameter indicative of a time localization, each of said fast wavelet transforming means transforming the output of said A/D converting means into the wavelet coefficient in accordance with the Infinite Impulse Response; and actuating means for actuating said restraint device when the wavelet coefficient transformed by each of said fast wavelet transforming means exceeds a predetermined value provided for each of said fast wavelet transforming means.

* * * * *